US00RE38111E

(19) United States
(12) Reissued Patent
LaDue et al.

(10) Patent Number: US RE38,111 E
(45) Date of Reissued Patent: May 6, 2003

(54) PRINTER WITH INTERNAL DOCUMENT DATA CONSTRUCTION

(75) Inventors: Philip G. LaDue, Bellbrook, OH (US); John H. King, Lebanon, OH (US); Scott J. Haman, Xenia, OH (US); Loren Schafer, Dayton, OH (US)

(73) Assignee: The Standard Register Company, Dayton, OH (US)

(21) Appl. No.: 09/568,379

(22) Filed: May 10, 2000

Related U.S. Patent Documents

Reissue of:
(64) Patent No.: 5,971,632
Issued: Oct. 26, 1999
Appl. No.: 08/808,948
Filed: Feb. 19, 1997

(51) Int. Cl.[7] ..... B41J 5/30
(52) U.S. Cl. ..... 400/68; 400/61; 400/76
(58) Field of Search ..... 400/68, 61, 70, 400/76

(56) References Cited

U.S. PATENT DOCUMENTS

| | | | |
|---|---|---|---|
| 4,746,932 | A | 5/1988 | Sato |
| 4,826,333 | A | 5/1989 | Tanaka |
| 4,944,614 | A | 7/1990 | Tanaka |
| 4,996,539 | A | 2/1991 | Haraga |
| 5,033,879 | A | 7/1991 | Abe |
| 5,104,245 | A | 4/1992 | Oguri et al. |
| 5,150,456 | A | 9/1992 | Wu et al. |
| 5,208,902 | A | 5/1993 | Kumon |
| 5,251,289 | A | 10/1993 | Fidler et al. |
| 5,322,378 | A | 6/1994 | Ikeda et al. |
| 5,349,647 | A | 9/1994 | Freiburg et al. |
| 5,371,837 | A | 12/1994 | Kimber et al. |
| 5,448,046 | A | 9/1995 | Swartz |
| 5,450,571 | A | 9/1995 | Rosekrans et al. |
| 5,469,533 | A | 11/1995 | Dennis |
| 5,481,656 | A | 1/1996 | Wakabayashi et al. |
| 5,526,469 | A | 6/1996 | Brindle et al. |
| 5,688,056 | A | 11/1997 | Peyret |
| 5,707,158 | A | 1/1998 | Hansel et al. |
| 5,784,544 | A | 7/1998 | Stevens |
| 5,816,717 | A | 10/1998 | Beadman et al. |

FOREIGN PATENT DOCUMENTS

| | | |
|---|---|---|
| EP | 0416508 A2 | 3/1991 |
| EP | 0572665 A1 | 12/1993 |

*Primary Examiner*—Andrew H. Hirshfeld
*Assistant Examiner*—Charles H. Nolan, Jr.
(74) *Attorney, Agent, or Firm*—Killworth, Gottman, Hagan & Schaeff LLP

(57) ABSTRACT

A document printer is provided comprising a printer housing, a user interface and an internal printer controller positioned within the printer housing. The internal printer controller is programmed to designate a document format according to a format command entered at the user interface. A data stream input port is in communication with the internal printer controller and is operative to receive a data stream. A document construction module is in communication with the internal printer controller. The document construction module enables the internal printer controller to (i) extract predetermined data fields from the data stream according to the designated document format and (ii) convert the extracted data fields to document data. A document data printing mechanism is responsive to the internal printer controller and is operative to print the document data in the designated document format. The format command may comprise a specification of a format identity or a specification of an automatic document format selection mode.

22 Claims, 4 Drawing Sheets

PRINTER WITH INTERNAL DOCUMENT DATA CONSTRUCTION

Matter enclosed in heavy brackets [ ] appears in the original patent but forms no part of this reissue specification; matter printed in italics indicates the additions made by reissue.

BACKGROUND OF THE INVENTION

The present invention relates to document printing and, more particularly, to a document printer wherein the capability of the printer's internal controller is enhanced through the addition of a document construction module and through the provision of improved document printing software. The document construction module and the improved printing software enable extraction of appropriate data fields from a data stream transmitted to the printer from a host. Data fields are extracted according to the identity of a specified or designated document data format and the extracted data fields are converted to document data for reproduction on a printed document.

Conventional label printing systems include a thermal or laser printer and a host computer which produces a data stream. The host, e.g., a personal computer, a minicomputer, or a mainframe, must be controlled, configured and/or programmed to communicate properly with the printer. For example, in the printing apparatus disclosed in U.S. Pat. No. 4,826,333, issued to Tanaka, a host computer in communication with a printer is controlled so as to transfer only specific types of data to the printer during specified time periods. Similarly, in the printing apparatus disclosed in U.S. Pat. No. 5,104,245, issued to Oguri et al., the host is programmed or controlled such that an instruction to change forms is intermittently inserted into the host data stream to cause the printer to produce a new form type. It is also necessary to ensure that the instruction to change forms is one which is recognized by the printer as a change form instruction.

The Standard Register Company of Dayton, Ohio, has introduced LABEL-LINKUP® as a means of avoiding reprogramming, reconfiguration, control, or other interference with the operations of the host computer and the content of the host data stream. The LABEL-LINKUP® system requires the connection of a controller comprising a keyboard, monitor, hard drive, etc., between the host and the document printer. Label appearance and printing operations can be changed without modifying the operating characteristics of the host by utilizing the LABEL-LINKUP® system. However, the LABEL-LINKUP® controller must remain connected between the host and the printer to continue printing operations and, consequently, a LABEL-LINKUP® controller must be provided at each printing location.

Accordingly, there is a need for a document printer and a document printing system for producing a variety of document formats from a host originated data stream wherein it is not necessary to control, reconfigure, or reprogram the host system or pass the data stream through a peripheral printing controller.

BRIEF SUMMARY OF THE INVENTION

This need is met by the present invention wherein a document printing system or a document printer are provided. The document printer includes an internal controller positioned within the printer housing and a document construction module. The internal controller is programmed to cause a document format to be designated according to a format command entered at the printer's user interface. The document construction module, which is in communication with the internal printer controller, stores data enabling the document printer to intercept a host data stream, extract predetermined data fields from the data stream, and convert the extracted data fields to document data.

In accordance with one embodiment of the present invention, a document printer is provided comprising a printer housing, a user interface and an internal printer controller positioned within the printer housing. The internal printer controller is programmed to designate a document format according to a format command entered at the user interface. A data stream input port is in communication with the internal printer controller and is operative to receive a data stream. A document construction module is in communication with the internal printer controller. The document construction module enables the internal printer controller to (i) extract predetermined data fields from the data stream according to the designated document format and (ii) convert the extracted data fields to document data. A document data printing mechanism is responsive to the internal printer controller and is operative to print the document data in the designated document format. The format command may comprise a specification of a format identity or a specification of an automatic document format selection mode.

The document construction module may further enable the internal printer controller to (i) identify automatic document selection data within the data stream intercepted at the data stream input port and (ii) designate the document format according to the format command and according to the identified automatic document selection data. A set of automatic document selection data is preferably stored in the document construction module and the document construction module preferably enables the internal printer controller to identify appropriate automatic document selection data by comparing the set of stored automatic document selection data with the data stream. The stored automatic document selection data preferably comprises at least one unique string identifier and a positional marker corresponding to the location of the unique string identifier within the data stream.

A plurality of document formats are preferably stored in respective document format files in the document construction module and one of the plurality of document formats comprises the designated document format. The document construction module may further enable the internal printer controller to convert the extracted data fields to the document data by merging the extracted data fields into a document format file. The document construction module is preferably positioned within the printer housing.

In accordance with another embodiment of the present invention, a document printing system is provided comprising a document printer including a printer housing, a user interface, an internal printer controller positioned within the printer housing and programmed to designate a document format according to a format command entered at the user interface, a document construction module in communication with the internal printer controller, a data stream input port in communication with the internal printer controller and operative to receive a data stream, a peripheral communications port, and a document data printing mechanism operative to print at least a portion of the data stream in the designated document format. Further, a file transfer device is coupled to the peripheral communications port and is operative to download files to the document construction module.

The document printing system may further comprise a host system coupled to the data stream input port. The host system is operative to generate the data stream. The file transfer device may be further operative to compress the downloaded files and upload files from the document construction module to the file transfer device. The file transfer device may also be operative to convert downloaded files to a language recognized by the document construction module and convert uploaded files to a language recognized by the file transfer device. The transferred files may comprise document format files or automatic document selection data files.

Accordingly, it is an object of the present invention to provide a document printer and a document printing system wherein a data stream generated by a peripheral device and containing data to be printed on a document in a specific format can be transferred directly to the printer and need not be passed through a peripheral printing controller.

DETAILED DESCRIPTION OF THE INVENTION

Figure 1:
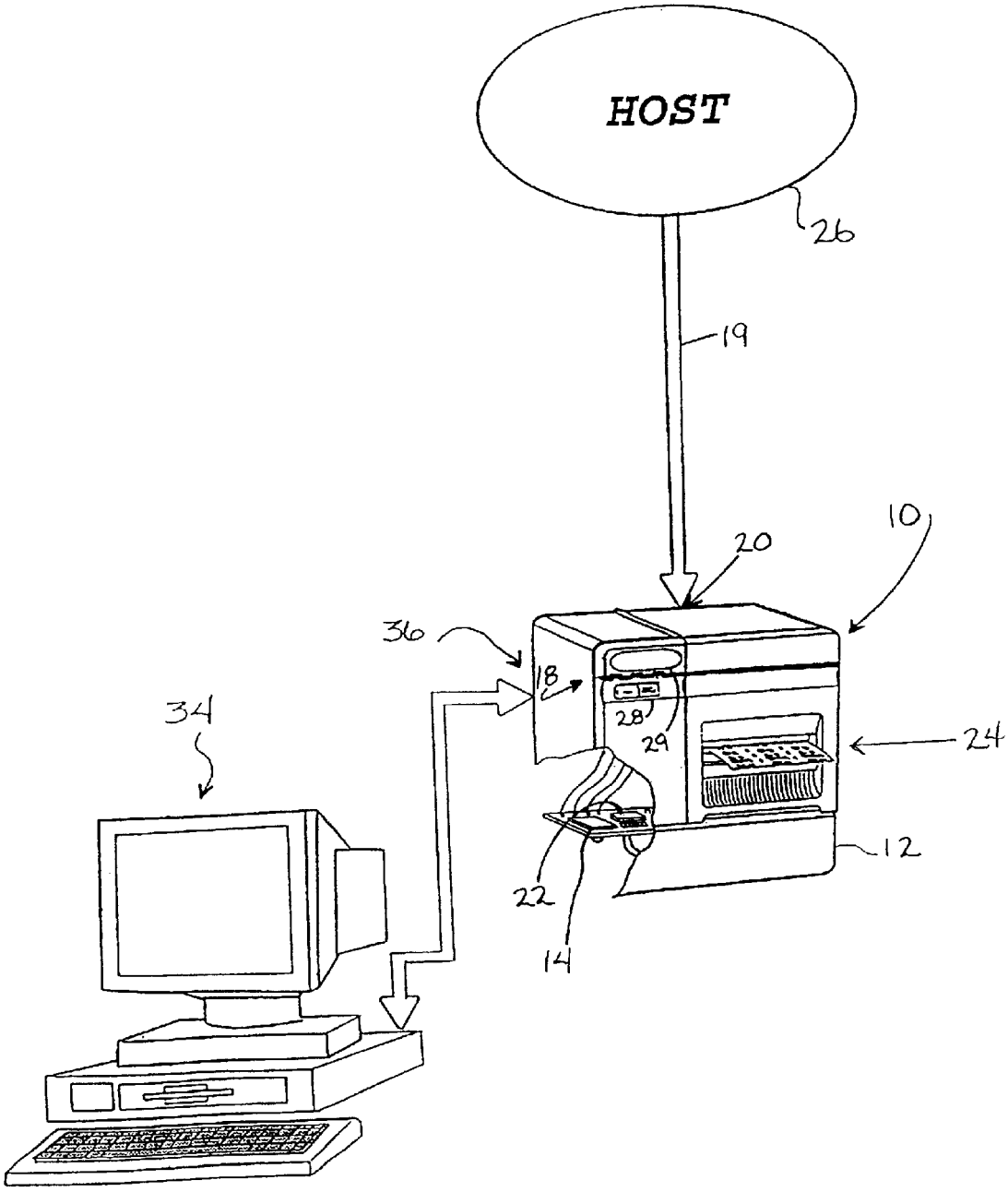
FIG. 1 is a schematic illustration of a document printing system according to the present invention.
Figure 2:
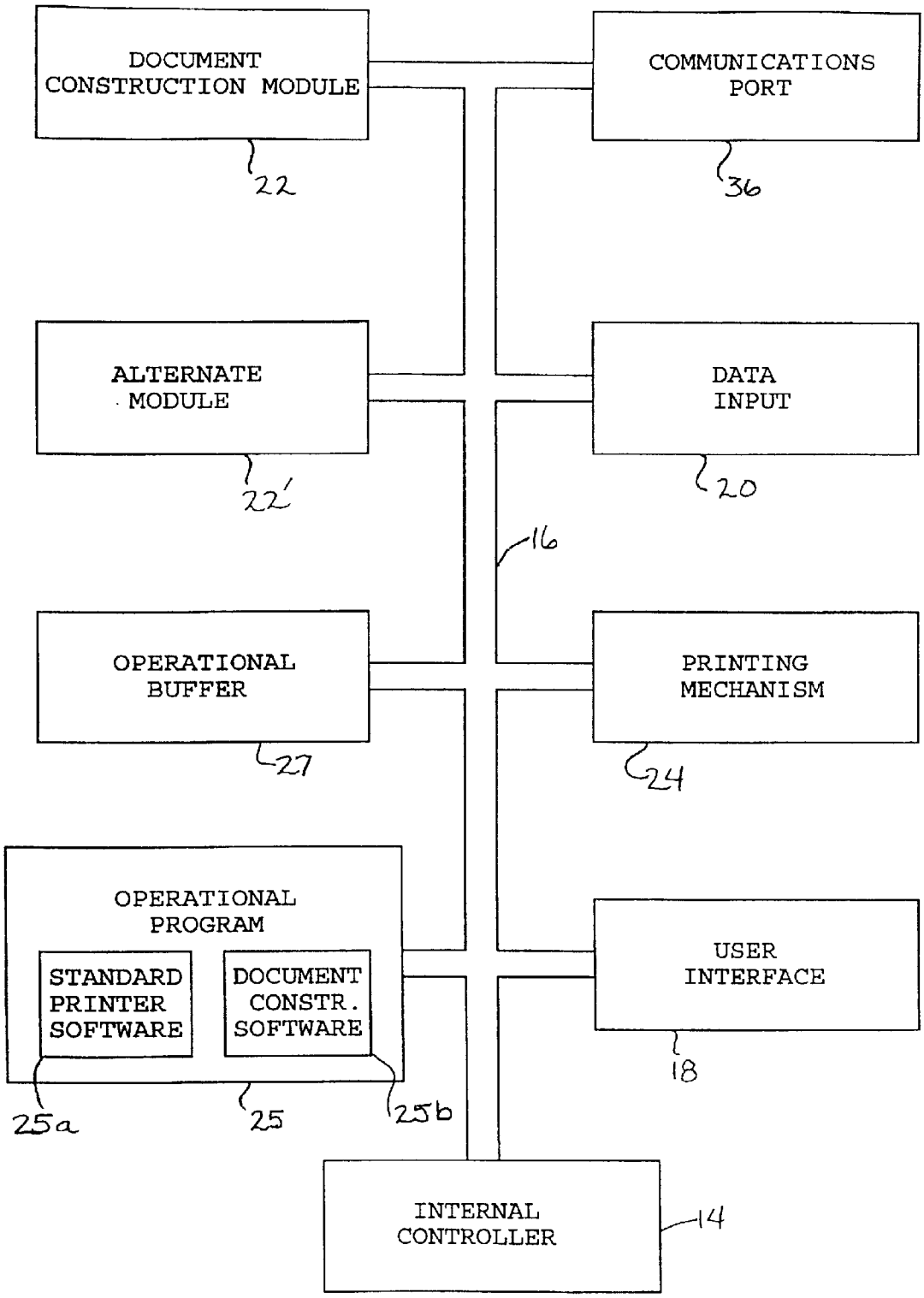
FIG. 2 is a schematic block diagram of document printer according to the present invention.

A document printer 10 according to the present invention is described herein with reference to FIGS. 1 and 2. The document printer 10 comprises a printer housing 12 and an internal printer controller 14 coupled to data, address, and control buses, represented generally by the digital bus 16. A user interface 18, a data stream input port 20, a document construction module 22, and a document data printing mechanism 24 are provided in communication with the internal printer controller 14 via the digital bus 16 and are controlled thereby according to various operating and applications programs resident in an operational program data storage device 25. Specifically, the operational program data storage device 25 includes standard printer software 25a incorporated or combined with document construction software 25b. The standard printer software 25a corresponds to control of basic printer functions while the document construction software 25b corresponds to control of document selection and construction applications described in detail herein. An operational buffer 27 is provided in communication with the internal controller 14 to facilitate the various data transfer routines described herein. The internal printer controller 14 preferably includes a digital central processing unit, is positioned within the printer housing 12, and is programmed to designate a document format according to a format command entered at the user interface 18.

The user interface 18 is similar to conventional printer interfaces in that it comprises a set of user operable keys or buttons 28 and an interface display 29. A specific command is entered at the user interface in the conventional manner by activating the keys 28 in response to prompting by the interface display 29. The format command entered at the user interface 18 is either a command which specifies a format identity, e.g., format "A", "B", "C", etc., or a command which specifies an automatic document format selection mode. Where the format command specifies a format identity, one of a plurality of document formats stored in respective document format files in the document construction module 22 becomes the designated document format. Where the format command specifies the automatic document format selection mode, one of the stored document formats is automatically designated by the internal printer controller 14 depending upon the content of a data stream 19 received at the data stream input port 18 from a peripheral device, e.g., a host computer 26.

The document construction module 22 comprises a non-volatile semiconductor memory device, e.g. a Flash memory, positioned within the printer housing 12. It is contemplated by the present invention that the document construction module 22 may be removably mounted within the printer housing 12 or may be otherwise provided in removable communication with the internal printer controller 14 so as to enable convenient maintenance, removal, replacement, and reprogramming thereof.

The document format files are stored in the document construction module 22. One of the document format files stored therein corresponds to the designated document format. Predetermined data fields are extracted from the data stream 19 generated by the host computer 26 as the internal printer controller 14 searches for the appropriate data within the data stream 19 generated by the host computer 26 and extracts the predetermined data fields from the data stream 19 according to the identity of the designated document format. Further, the internal printer controller 14, in cooperation with the document construction module 22, converts the extracted data fields to document data by integrating or merging the extracted data fields into the document format file in the operational buffer 27, thereby creating a new document printer file to be processed by the controller.

Accordingly, the document construction module 22 enables the internal printer controller 14 to extract predetermined data fields from the data stream 19 according to the designated document format and convert the extracted data fields to document data. The document data printing mechanism 24, being responsive to the internal printer controller 14, is operative to print the document data in the document format designated according to the format command entered at the user interface 18.

A set of automatic document selection data is also stored in the document construction module 22. If an automatic document selection mode is specified by the format command, the internal printer controller 14 compares the set of stored automatic document selection data with the data stream 19 to identify automatic document selection data within the data stream 19. Accordingly, the document construction module 22 enables the internal printer controller 14 to identify appropriate automatic document selection data. It is contemplated by the present invention that automatic document selection data need not be stored in the document construction module 22 if automatic document selection is not an object of the particular embodiment of the present invention.

The set of stored automatic document selection data comprises a group of unique string identifiers and corresponding positional markers associated with each unique string identifier. Each unique string identifier represents at least one character within the data stream 19, the identity and relative position of which remains the same for each data stream corresponding to a particular document type. Further, to reduce the possibility of error in the automatic document selection mode, the position and identity of the unique string identifier is unique to the particular document type. The corresponding positional markers are indicative of the location of the unique string identifier relative to a predetermined line number within the data stream. For example, a data stream corresponding to a particular document type, e.g., a label, may include a plurality of characters arranged as follows:

TABLE 1

| Line | Data Characters |
|---|---|
| 1 | 123456789 5516842-1 11/18/93 |
| 2 | ELM, JUNE C OPT |
| 3 | DR. TIPP |
| 4 | 6/22/17 M 40 CLASS |
| 5 | STUART & LEE |
| 6 | 517 892 9084 |

where "OPT" is the unique string identifier because it appears in the same position within the second line of every data stream corresponding to the particular document type and, preferably, appears only in data streams corresponding to the particular document type. The data stream is parsed according to line number, column number, and field length:

TABLE 2

| Line | Column | Length | Field Content |
|---|---|---|---|
| 1 | 1 | 9 | 123456789 |
| 1 | 13 | 18 | 5516842-1 11/18/93 |
| 2 | 1 | 11 | ELM, JUNE C |
| 2 | 14 | 3 | OPT |
| 3 | 1 | 8 | DR. TIPP |
| 4 | 1 | 7 | 6/22/17 |
| 4 | 10 | 10 | M 40 CLASS |
| 5 | 1 | 12 | STUART & LEE |
| 6 | 1 | 12 | 517 892 9084 |

To enable automatic document selection, the set of automatic document selection data stored in the document construction module 22 includes the unique string identifier "OPT" and a positional marker corresponding to line 2, column 14, of the parsed data stream. When the unique string identifier "OPT" and its corresponding positional marker "line 2, column 14" match the identity and position of specific characters in the data stream, automatic document selection data is identified, the corresponding document format is designated, the appropriate data fields are extracted from the data stream according to the designated document format, and the extracted data fields are converted to document data for printing.

Accordingly, where the automatic document selection mode is specified at the user interface 18, the interface printer controller 14, in cooperation with the document construction module 22, identifies automatic document selection data within the data stream 19 intercepted at the data stream input port 20 and designates the document format for printing according to the format command entered at the user interface 18 and according to the identified automatic document selection data.

It is contemplated by the present invention that a data stream may be parsed according to line numbers defined by periodic carriage return/line feed characters or by any character or string of characters. For example, the beginning and end of successive line numbers may be defined by semicolons or doublespaces. According to the operation of the internal controller 14, and the associated components described above, a keyboard, not shown in the Figs. because of the well known configuration thereof, may be coupled to either the communications port 36 or the data input port 20. In this manner, keyboard entries are transmitted to the printer 10 as manual data streams 19. Similarly, printer set-up data may also be transmitted to the printer 10 in this manner.

Figure 3:
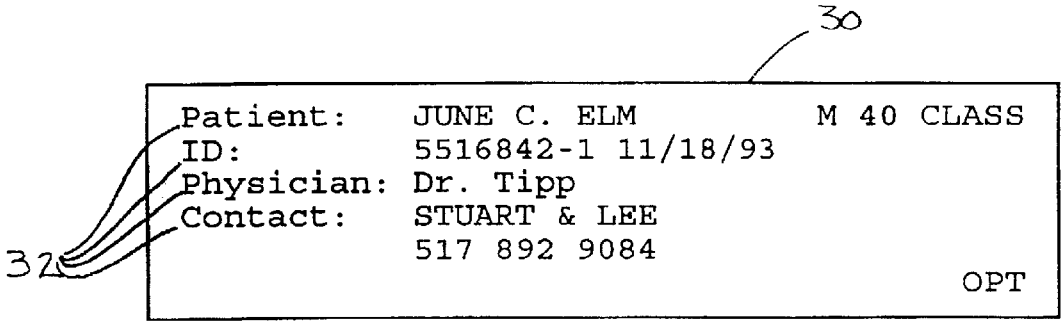
FIG. 3 is an illustration of a printed document according to the present invention.

FIG. 3 illustrates an example of a printed document 30 wherein data fields are extracted from the characters reproduced in Table 2. In the printed document illustrated in FIG. 3, the field corresponding to the automatic document selection data "OPT" has been reproduced in the lower right corner of the document 30. The first and sixth fields have not been extracted or printed on the document 30. The document 30 also includes form characters 32 reproduced from the corresponding document format file.

FIG. 1 also illustrates a file transfer device 34 coupled to a peripheral communications port 36 of the document printer 10. It is contemplated by the present invention that the file transfer device 34 may alternatively be coupled to the data input port 20 of the document printer 10, in which case the peripheral communications port 36 need not be provided. The file transfer device 34 is operative to download files to the document construction module 22 and compress the downloaded files to conserve storage space in the document construction module 22. Conversely, the file transfer device 34 is further operative to upload files from the document construction module 22. Further, in one embodiment, an alternate document construction module 22' is provided to increase the versatility of the printer 10. The alternate module 22' functions in substantially the same manner as the document construction module 22 with the exception that many or all of the automatic document selection data files and document data files stored in each module 22, 22' will differ from one module to the next. The internal printer controller 14 is operative to communicate selectively with either of the modules 22, 22'. When necessary, the file transfer device 34 converts the downloaded files to a language recognized by the document construction module 22 and converts the uploaded files to a language recognized by the file transfer device 34. Accordingly, the printer 10 described herein may be reprogrammed to print a variety of document formats and to automatically select a variety of documents by transferring to the document construction module 22 updated or additional document format files and automatic document selection data files.

Figure 4:
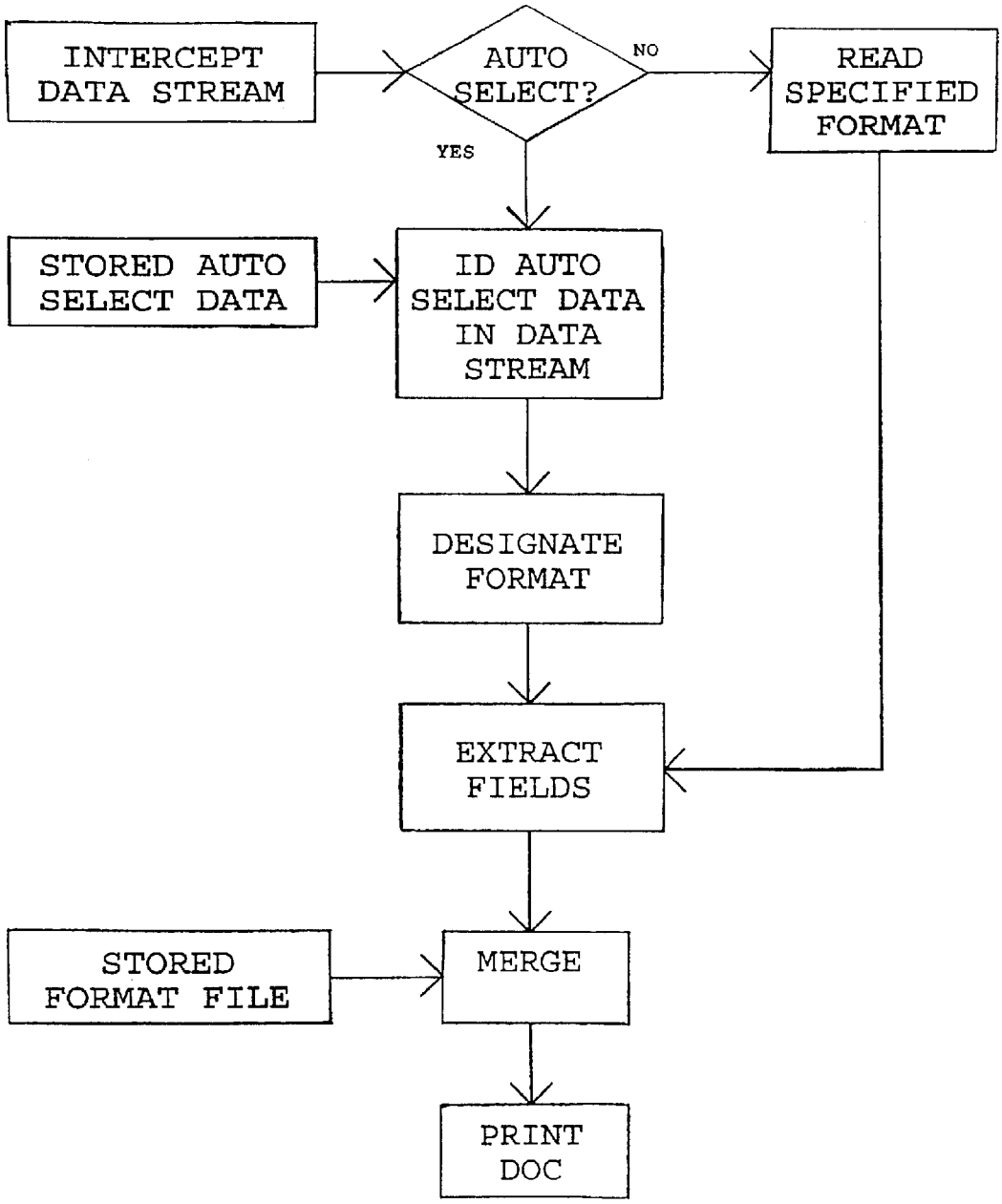
FIG. 4 is a flow chart illustrating the present invention.

FIG. 4 is a flow chart further illustrating the operation of the printer of the present invention. First, the data stream 19 generated by the host 26, or some other peripheral device, is intercepted at the data stream input port 20. Next, according to the operational sequence of the internal printer controller 14, it is determined whether the format command entered at the user interface 18 has specified the automatic document selection mode. If so, automatic document selection data are identified in the data stream 19 by comparing the data stream 19 with the stored automatic document selection data and a document format is designated. If the automatic document selection mode has not been identified, then the document format designated according to the format command is read. In either case, once the document format is designated, the appropriate data fields are extracted, merged with appropriate stored format file in the operational buffer 27, and a document is printed.

Having described the invention in detail and by reference to preferred embodiments thereof, it will be apparent that modifications and variations are possible without departing from the scope of the invention defined in the appended claims. For example, it is contemplated by the present invention that operations described herein as being performed by the internal printer controller 14 may alternatively be performed by a component in communication with the controller in response to a signal from the controller.

We claim:

1. A document printing system for generating a printed document in a predetermined document format, wherein said document printing system comprises:

an external data stream input port for receiving an external data stream comprised of a plurality of data fields defining data to be printed in conjunction with said printed document;

a host computer programmed to generate said plurality of data fields within said external data stream, wherein said external data stream is coupled to said host computer such that content of said external data stream is defined by said plurality of data fields; and a document printer including said external data stream input port such that said content of said external data stream is received at said external data stream input port, wherein said document printer further comprises (i) a printer housing, (ii) a user interface operative to initiate transmission of a format command along a first data path, wherein said format command represents a predetermined selection of data fields in said external data stream and a predetermined printed document format, (iii) an internal printer controller positioned within said printer housing, wherein said internal printer controller is arranged to be in communication with said user interface along said first data path, said external data stream input port is arranged to be in communication with said internal printer controller along a second data path, said second data path is arranged to be distinct from said first data path, and said external data stream input port is arranged to be distinct from said user interface, (iv) a document construction module in communication with said internal printer controller, wherein said document construction module includes a plurality of document formats stored therein in the form of respective stored document format files, and wherein said internal printer controller is programmed to designate one of said document formats stored in said document construction module according to said format command entered at said user interface and transmitted along said first data path, search for predetermined ones of said plurality of data fields within said external data stream, extract said predetermined ones of said plurality of data fields from said external data stream to yield an extracted set of data fields, wherein said predetermined data fields are extracted according to said document format designated by said internal printer controller in response to said format command entered at said user interface and transmitted along said first data path, and convert said extracted set of data fields to document data, and (vi) a document data printing mechanism responsive to said internal printer controller and operative to print said document data converted from said extracted set of data fields in said designated document format.

2. A document printing system as claimed in claim 1 wherein said format command comprises a format identity and wherein said internal printer controller is programmed to designate one of said document formats according to said format identity.

3. A document printing system as claimed in claim 1 wherein said format command comprises an automatic document format selection command and wherein said internal printer controller is programmed to automatically designate one of said document formats in response to said automatic document format selection command.

4. A document printing system as claimed in claim 3 wherein said internal printer controller is programmed to automatically designate said document format by identifying automatic document selection data within said external data stream.

5. A document printing system as claimed in claim 4 wherein said document construction module further includes a set of automatic document selection data stored therein and wherein said internal printer controller is programmed to identify said automatic document selection data within said external data stream by comparing said set of stored automatic document selection data with data within said external data stream.

6. A document printing system as claimed in claim 5 wherein each unit of said set of said stored automatic document selection data comprises a unique string identifier and a positional marker corresponding to the location of the unique string identifier within said external data stream.

7. A document printing system as claimed in claim 1 wherein a plurality of document formats are stored in respective document format files in said document construction module and wherein one of said plurality of document formats comprises said designated document format.

8. A document printing system as claimed in claim 1 wherein said internal printer controller is further programmed to convert said extracted data fields to said document data by merging said extracted data fields into a document format file.

9. A document printing system as claimed in claim 1 wherein said document construction module is positioned within said printer housing.

10. A document printing system for generating a printed document in a predetermined document format, wherein said document printing system comprises:

an external data stream input port for receiving an external data stream comprised of a plurality of data fields defining data to be printed in conjunction with said printed document;

a host computer programmed to generate said plurality of data fields within said external data stream, wherein said external data stream is coupled to said host computer such that content of said external data stream is defined by said plurality of data fields;

a document printer including said external data stream input port such that said content of said external data stream is received at said external data stream input port, wherein said document printer further comprises (i) a printer housing, (ii) a user interface operative to initiate transmission of a format command along a first data path, wherein said format command represents a predetermined selection of data fields in said external data stream and a predetermined printed document format, (iii) an internal printer controller positioned within said printer housing, wherein said internal printer controller is arranged to be in communication with said user interface along said first data path, said external data stream input port is arranged to be in communication with said internal printer controller along a second data path, said second data path is arranged to be distinct from said first data path, and said external data stream input port is arranged to be distinct from said user interface, (iv) a document construction module in communication with said internal printer controller, wherein said document construction module includes a plurality of document formats stored therein in the form of respective stored document format files, and wherein said internal printer controller is programmed to designate one of said document formats stored in said document construction module according to said format command entered at said user interface and transmitted along said first data path, search for predetermined ones of said plurality of data fields within said external data stream, extract said predetermined ones of said plurality of data fields from said external data stream to yield an extracted set of data fields, wherein said predetermined data fields are extracted according to said document format designated by said internal printer controller in response to said format command entered at said user interface and transmitted along said first data path, and convert said extracted set of data fields to document data, (vi) a peripheral communications port distinct from said external data stream input port, and (vii) a document data printing mechanism responsive to said internal printer controller and operative to print said document data converted from said extracted set of data fields in said designated document format; and a file transfer device coupled to said peripheral communications port and operative to download files from said file transfer device to said document construction module.

11. A document printing system as claimed in claim 10 wherein said file transfer device is further operative to compress said downloaded files.

12. A document printing system as claimed in claim 10 wherein said file transfer device is further operative to upload files from said document construction module to said file transfer device.

13. A document printing system as claimed in claim 10 wherein said file transfer device is further operative to convert said downloaded files to a language recognized by said document construction module.

14. A document printing system as claimed in claim 10 wherein said file transfer device is further operative to convert said uploaded files to a language recognized by said document construction module.

15. A document printing system as claimed in claim 10 wherein said transferred files comprise document format files.

16. A document printing system as claimed in claim 10 wherein said transferred files comprise automatic document selection data files.

*17. A document printer comprising:*

*a printer housing;*

*a user interface coupled to a first data path;*

*an internal printer controller positioned within said printer housing, wherein said internal printer controller is in communication with said user interface along said first data path;*

*an external data stream input port operative to receive an external data stream including automatic document selection data, wherein said external data stream input port is in communication with said internal printer controller along a second data path;*

*a document construction module in communication with said internal printer controller, wherein said internal printer controller is programmed to*

*identify automatic document selection data stored in said document construction module corresponding to said automatic document selection data within said external data stream received at said external data stream input port,*

*designate a document format according to said identified automatic document selection data,*

*search for appropriate data fields within said external data stream,*

*extract said appropriate data fields from said external data stream according to the identity of said designated document format, and*

*convert said extracted data fields to document data by integrating or merging the extracted data fields with a designated document format file; and*

*a document data printing mechanism responsive to said internal printer controller and operative to print said document data in said designated document format.*

*18. A document printer as claimed in claim 17 wherein said controller is programmed to identify automatic document selection data including a string identifier.*

*19. A document printer as claimed in claim 17 wherein said controller is programmed to identify automatic document selection data including a string identifier and a positional marker.*

*20. A document printer as claimed in claim 19 wherein said string identifier and said positional marker match specific characters in said external data stream.*

*21. A document printing system for generating a printed document in a predetermined document format, wherein said document printing system comprises:*

*an external data stream input port for receiving an external data stream comprised of a plurality of data fields defining data to be printed in conjunction with said printed document;*

*a peripheral device programmed to generate said plurality of data fields within said external data stream, wherein said external data stream is coupled to said peripheral device such that content of said external data stream is defined by said plurality of data fields; and*

*a document printer including said external data stream input port such that said content of said external data stream is received at said external data stream input port, wherein said document printer further comprises*

*(i) a printer housing,*

*(ii) a user interface operative to initiate transmission of a format command along a first data path, wherein said format command represents a predetermined selection of data fields in said external data stream and a predetermined printed document format,*

*(iii) an internal printer controller positioned within said printer housing, wherein*

*said internal printer controller is arranged to be in communication with said user interface along said first data path,*

*said external data stream input port is arranged to be in communication with said internal printer controller along a second data path,*

*said second data path is arranged to be distinct from said first data path, and*

*said external data stream input port is arranged to be distinct from said user interface,*

(*iv*) *a document construction module in communication with said internal printer controller, wherein said document construction module includes a plurality of document formats stored therein in the form of respective stored document format files, and wherein said internal printer controller is programmed to*

*designate one of said document formats stored in said document construction module according to said format command entered at said user interface and transmitted along said first data path,*

*search for predetermined ones of said plurality of data fields within said external data stream,*

*extract said predetermined ones of said plurality of data fields from said external data stream to yield an extracted set of data fields, wherein said predetermined data fields are extracted according to said document format designated by said internal printer controller in response to said format command entered at said user interface and transmitted along said first data path, and*

*convert said extracted set of data fields to document data, and*

(*vi*) *a document data printing mechanism responsive to said internal printer controller and operative to print said document data converted from said extracted set of data fields in said designated document format.*

*22. A document printing system for generating a printed document in a predetermined document format, wherein said document printing system comprises:*

*an external data stream input port for receiving an external data stream comprised of a plurality of data fields defining data to be printed in conjunction with said printed document;*

*a peripheral device programmed to generate said plurality of data fields within said external data stream, wherein said external data stream is coupled to said peripheral device such that content of said external data stream is defined by said plurality of data fields;*

*a document printer including said external data stream input port such that said content of said external data stream is received at said external data stream input port, wherein said document printer further comprises*

(*i*) *a printer housing,*

(*ii*) *a user interface operative to initiate transmission of a format command along a first data path, wherein said format command represents a predetermined selection of data fields in said external data stream and a predetermined printed document format,*

(*iii*) *an internal printer controller positioned within said printer housing, wherein*

*said internal printer controller is arranged to be in communication with said user interface along said first data path,*

*said external data stream input port is arranged to be in communication with said internal printer controller along a second data path,*

*said second data path is arranged to be distinct from said first data path, and*

*said external data stream input port is arranged to be distinct from said user interface,*

(*iv*) *a document construction module in communication with said internal printer controller, wherein said document construction module includes a plurality of document formats stored therein in the form of respective stored document format files, and wherein said internal printer controller is programmed to*

*designate one of said document formats stored in said document construction module according to said format command entered at said user interface and transmitted along said first data path,*

*search for predetermined ones of said plurality of data fields within said external data stream,*

*extract said predetermined ones of said plurality of data fields from said external data stream to yield an extracted set of data fields, wherein said predetermined data fields are extracted according to said document format designated by said internal printer controller in response to said format command entered at said user interface and transmitted along said first data path, and*

*convert said extracted set of data fields to document data,*

(*vi*) *a peripheral communications port distinct from said external data stream input port, and*

(*vii*) *a document data printing mechanism responsive to said internal printer controller and operative to print said document data converted from said extracted set of data fields in said designated document format; and*

*a file transfer device coupled to said peripheral communications port and operative to download files from said file transfer device to said document construction module.*

* * * * *

UNITED STATES PATENT AND TRADEMARK OFFICE

CERTIFICATE OF CORRECTION

PATENT NO. : Re 38,111 E
DATED : May 6, 2003
INVENTOR(S) : LaDue et al.

It is certified that error appears in the above-identified patent and that said Letters Patent is hereby corrected as shown below:

Column 5,
Line 49, "18, the interface" should read -- 18, the internal --

Signed and Sealed this

Second Day of March, 2004

JON W. DUDAS
*Acting Director of the United States Patent and Trademark Office*